US012705621B2

(12) United States Patent
Fenichel et al.

(10) Patent No.: US 12,705,621 B2
(45) Date of Patent: Aug. 11, 2026

(54) MULTI-FACTOR AUTHENTICATION USING LOCATION DATA

(71) Applicant: Capital One Services, LLC, McLean, VA (US)

(72) Inventors: Allison Fenichel, Brooklyn, NY (US); John Oliva Gilling, Brooklyn, NY (US); Aditya Pai, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 47 days.

(21) Appl. No.: 17/932,431

(22) Filed: Sep. 15, 2022

(65) Prior Publication Data

US 2024/0095740 A1 Mar. 21, 2024

(51) Int. Cl.
*G06Q 20/40* (2012.01)
*G06Q 20/38* (2012.01)

(52) U.S. Cl.
CPC ..... *G06Q 20/4015* (2020.05); *G06Q 20/3821* (2013.01)

(58) Field of Classification Search
CPC ....................... G06Q 20/4015; G06Q 20/3821
USPC ........................................................... 705/44
See application file for complete search history.

(56) References Cited

U.S. PATENT DOCUMENTS 10,380,595 B2 * 8/2019 Karnati .............. G06Q 30/0251
11,250,040 B2 2/2022 Gilling et al.
11,416,869 B2 * 8/2022 Parker ................... H04W 12/06
11,605,084 B2 * 3/2023 Benkreira ............. H04W 4/029
11,783,335 B2 * 10/2023 Phillips ............... H04L 63/0492 705/44
12,041,041 B2 * 7/2024 Colon ................... H04W 4/021
12,086,821 B2 * 9/2024 Song .................. G06Q 20/4016
12,248,606 B2 * 3/2025 Landy ................. G06F 21/6245
12,437,301 B2 * 10/2025 Lenkala ................. G06N 20/00
2015/0088744 A1 * 3/2015 Raduchel ............. G06Q 20/384 705/44

(Continued)

FOREIGN PATENT DOCUMENTS

CN 115552843 A * 12/2022 ............. G06N 3/049

OTHER PUBLICATIONS

A. Ometov, V. Petrov, S. Bezzateev, S. Andreev, Y. Koucheryavy and M. Gerla, "Challenges of Multi-Factor Authentication for Securing Advanced IoT Applications," in IEEE Network, vol. 33, No. 2, pp. 82-88, Mar./Apr. 2019. (Year: 2019).*

(Continued)

*Primary Examiner* — Virpi H Kanervo
(74) *Attorney, Agent, or Firm* — Harrity & Harrity, LLP

(57) ABSTRACT

In some implementations, a device may obtain first location data associated with one or more exchanges, where the first location data is associated with a first level of granularity. The device may determine second location data associated with the one or more exchanges based on records associated with the one or more exchanges, where the second location data is associated with a second level of granularity that is higher than the first level of granularity. The device may detect an authentication event associated with an access attempt to the account. The device may provide, based on detecting the authentication event, one or more authentication queries that are based on the second location data. The device may authenticate the access attempt to the account based on one or more responses to the one or more authentication queries.

20 Claims, 7 Drawing Sheets

(56) References Cited

U.S. PATENT DOCUMENTS

| | | | | |
|---|---|---|---|---|
| 2017/0118576 | A1* | 4/2017 | Sharifi | H04L 67/535 |
| 2017/0357971 | A1* | 12/2017 | Pitz | H04W 4/021 |
| 2021/0056574 | A1* | 2/2021 | Song | G06Q 20/4016 |
| 2021/0350375 | A1* | 11/2021 | Li | G06Q 20/3224 |
| 2022/0215393 | A1* | 7/2022 | Lenkala | G06Q 20/4015 |
| 2023/0222212 | A1* | 7/2023 | Mullins | G06F 21/51<br>726/26 |
| 2024/0037195 | A1* | 2/2024 | Scot | G06F 21/31 |
| 2024/0073258 | A1* | 2/2024 | Edwards | H04L 65/1076 |
| 2024/0086569 | A1* | 3/2024 | Landy | G06F 21/604 |

OTHER PUBLICATIONS

Misbahuddin et al., "Design of a risk based authentication system using machine learning techniques," 2017 IEEE SmartWorld, Ubiquitous Intelligence & Computing, Advanced & Trusted Computed, Scalable Computing & Communications, Cloud & Big Data Computing, Internet of People. (Year: 2017).*

P. Voege and A. Ouda, "An Innovative Multi-Factor Authentication Approach," 2022 International Symposium on Networks, Computers and Communications (ISNCC), Shenzhen, China, 2022, pp. 1-6. (Year: 2022).*

W. Li, H. Cheng, P. Wang and K. Liang, "Practical Threshold Multi-Factor Authentication," in IEEE Transactions on Information Forensics and Security, vol. 16, pp. 3573-3588, 2021. (Year: 2021).*

Jordan, Michael I., and Tom M. Mitchell. "Machine learning: Trends, perspectives, and prospects." Science 349.6245 (2015): 255-260. (Year: 2015).*

K. I. Ramatsakane and W. S. Leung, "Pick location security: Seamless integrated multi-factor authentication," 2017 IST-Africa Week Conference (IST-Africa), Windhoek, Namibia, pp. 1-10. (Year: 2017).*

U. A. Abdurrahman, M. Kaiiali and J. Muhammad, "A new mobile-based multi-factor authentication scheme using pre-shared number, GPS location and time stamp," 2013 International Conference on Electronics, Computer and Computation (ICECCO), Ankara, Turkey, pp. 293-296. (Year: 2013).*

Ometov, Aleksandr, et al. "Multi-factor authentication: A survey." Cryptography 2.1 (2018): 1. (Year: 2018).*

K. I. Ramatsakane and W. S. Leung, "Pick location security: Seamless integrated multi-factor authentication," 2017 IST-Africa Week Conference (IST-Africa), Windhoek, Namibia, 2017, pp. 1-10. (Year: 2017).*

Lami, Ihsan, et al. "LocBiometrics: Mobile phone based multifactor biometric authentication with time and location assurance." 18th Telecommunications forum TELFOR. (Year: 2010).*

* cited by examiner

MULTI-FACTOR AUTHENTICATION USING LOCATION DATA

BACKGROUND

Impersonation or identity theft may occur when the name, image, or other identifying elements of a person, company, or organization are used for illegitimate purposes. In particular, impersonation or identity theft may occur when an account is opened using the name, image, or other identifying elements of a person, company, or organization and/or when a legitimate account is accessed and used to engage in unauthorized activities. Multi-factor authentication (MFA) is an authentication technique in which a user of a computing device is granted access to a resource (e.g., an account, a computing resource, a network resource, or an application) only after successfully proving two or more factors to an authentication service. The two or more factors may include knowledge (e.g., something only the user knows), possession (e.g., something only the user has), and/or inherence (e.g., something only the user is).

SUMMARY

Some implementations described herein relate to a system for multi-factor authentication using location data. The system may include one or more memories and one or more processors coupled to the one or more memories. The one or more processors may be configured to obtain first location data associated with one or more exchanges on records that are associated with an account. The one or more processors may be configured to analyze, using a machine learning model, the records to identify second location data associated with the one or more exchanges, wherein the second location data identifies respective physical locations associated with the one or more exchanges. The one or more processors may be configured to detect an authentication event associated with providing access to the account, wherein the authentication event occurs after authenticating credentials associated with the account. The one or more processors may be configured to provide, based on detecting the authentication event, one or more authentication queries that are based on the second location data, wherein the one or more authentication queries are associated with at least one of the respective physical locations associated with the one or more exchanges. The one or more processors may be configured to grant or deny access to the account based on one or more responses to the one or more authentication queries.

Some implementations described herein relate to a method of multi-factor authentication using location data. The method may include obtaining, by a device, first location data associated with one or more exchanges that are associated with an account. The method may include determining, by the device, second location data associated with the one or more exchanges based on records associated with the one or more exchanges, wherein the second location data is associated with a second level of granularity that is higher than the first level of granularity. The method may include detecting, by the device, an authentication event associated with an access attempt to the account. The method may include providing, by the device and based on detecting the authentication event, one or more authentication queries that are based on the second location data. The method may include authenticating, by the device, the access attempt to the account based on one or more responses to the one or more authentication queries.

Some implementations described herein relate to a non-transitory computer-readable medium that stores a set of instructions for a device. The set of instructions, when executed by one or more processors of the device, may cause the device to obtain records associated with one or more exchanges that are associated with an account, wherein the records include first location data associated with the one or more exchanges. The set of instructions, when executed by one or more processors of the device, may cause the device to determine second location data associated with the one or more exchanges based on the records, wherein the second location data includes address information associated with respective entity locations at which the one or more exchanges occurred. The set of instructions, when executed by one or more processors of the device, may cause the device to detect an authentication event associated with an access attempt to the account. The set of instructions, when executed by one or more processors of the device, may cause the device to provide, based on detecting the authentication event, one or more authentication queries that are based on the second location data. The set of instructions, when executed by one or more processors of the device, may cause the device to authenticate the access attempt to the account based on one or more responses to the one or more authentication queries and based on credentials provided as part of the access attempt.

DETAILED DESCRIPTION

Figure 1A:
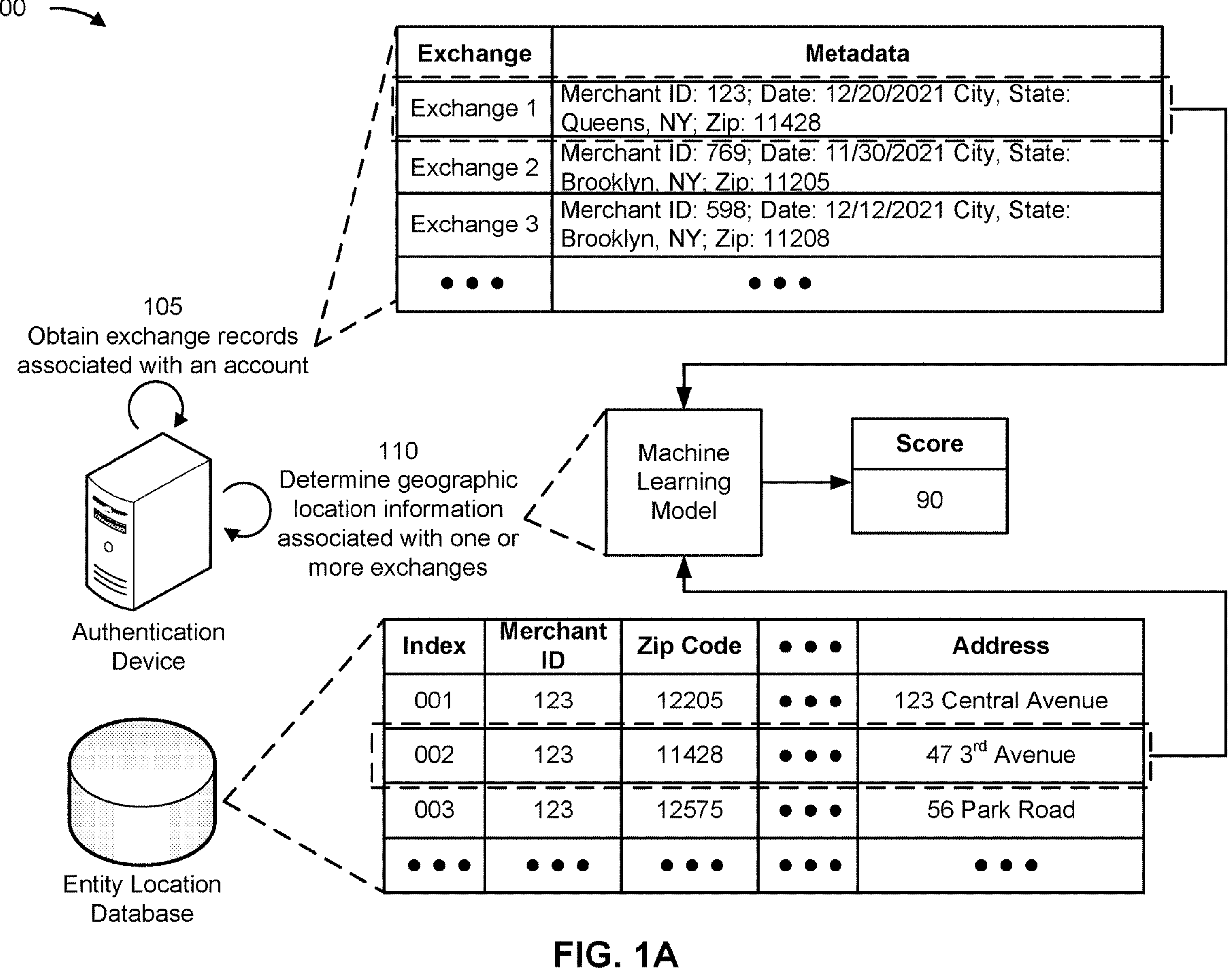
FIGS. 1A-1C are diagrams of an example associated with multi-factor authentication using location data, in accordance with some embodiments of the present disclosure.

The following detailed description of example implementations refers to the accompanying drawings. The same reference numbers in different drawings may identify the same or similar elements.

Multi-factor authentication is an extra layer of security that requires a user to provide multiple credentials to access a resource (e.g., an account, a computing resource, a network resource, or an application). For example, a user may be required to provide not only a username and a password, but also a piece of information to which only the user has access at the time of the transaction, such as a token, and/or an access code, among other examples. Using a username and a password together with the piece of information to which only the user has access makes it more difficult for malicious actors to gain access to and steal the private data of the user.

For example, a user may utilize a device to access an account via an application executing on the device. The application may require that the user provide credentials (e.g., a username and a password) for the account. The device may provide the credentials to a server device, and, typically, the server device will provide (e.g., via a text message or phone call) a secondary authentication, such as an access code, to the device. The application may require the user to input the access code before access is granted to the account. As another example, the server device may provide one or more security questions that must be answered correctly by the user for the server device to grant the user access to the account. However, such a process is cumbersome for the user and may still be prone to fraudulent acts, such as via "man-in-the-middle" attacks and/or if the device is stolen and being utilized by a malicious actor.

Multi-factor authentication may be vulnerable to attacks by malicious actors because the secondary authentication information used to authenticate a user may be provided to the user (e.g., via a secondary device or other means). Therefore, the transmission of the secondary authentication information can be intercepted and/or otherwise obtained by malicious actors. As another example, the secondary authentication information may rely on information that can be readily obtained (e.g., via searches, social engineering, or otherwise) by a malicious actor. Therefore, although multi-factor authentication increases security by adding additional layers of authentication, current multi-factor authentication techniques are still susceptible to attack by malicious actors.

Some implementations described herein enable multi-factor authentication using location data. For example, the location data may be associated with locations (e.g., physical locations) at which the user completed one or more transactions. For example, an authentication device may obtain records associated with one or more transactions that are associated with an account. The records may include first location data associated with the one or more transactions. The first location data may be at a low level of granularity. For example, the most specific location information associated with a transaction (e.g., as indicated by the records) may be a zip code. The authentication device may analyze (e.g., using a machine learning model) the records to identify second location data associated with the one or more exchanges. The second location data may be respective physical locations (e.g., an address or other specific location information) associated with the one or more transactions. In other words, the authentication device may cleanse transaction records by determining additional physical locations associated with one or more transactions indicated by the transaction records.

The authentication device may detect an authentication event associated with providing access to the account. The authentication device may provide one or more authentication queries that are based on the second location data. For example, the one or more authentication queries may be associated with at least one of the respective physical locations associated with the one or more exchanges (e.g., an authentication query may request a user to confirm an address at which they completed a transaction). The authentication device may grant or deny access to the account based on one or more responses to the one or more authentication queries.

This may improve security associated with the account because the secondary information used to authenticate access attempts associated with the account is extracted or analyzed by the authentication device from transaction records. For example, even if a malicious actor were to obtain the transaction records, the malicious actor would only be able to obtain the first location data which may not provide location information with enough specificity to enable the malicious actor to correctly answer the authentication query generated by the authentication device. In other words, extracting or identifying the second location data enables the authentication device to generate authentication queries using information that would only be known by a user who was physically present when the transaction occurred (e.g., a cardholder of the account) because the specific address associated with the transaction is not otherwise stored or indicated in the records. As a result, the authentication device may be enabled to make improved authentication determinations for access attempts to the account, thereby improving security associated with the account.

Figure 1B:
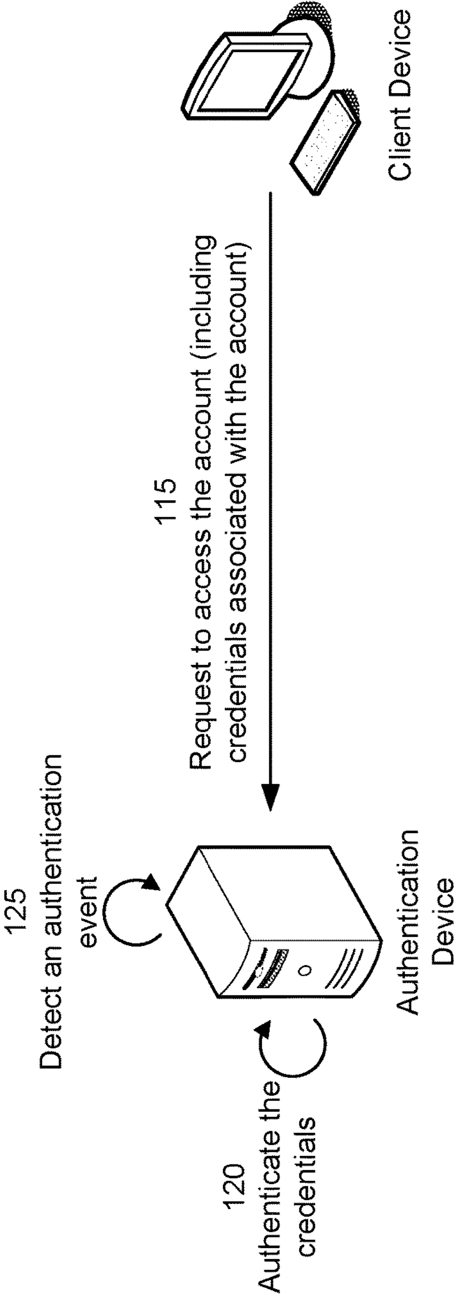
Figure 1B:
Figure 1C:
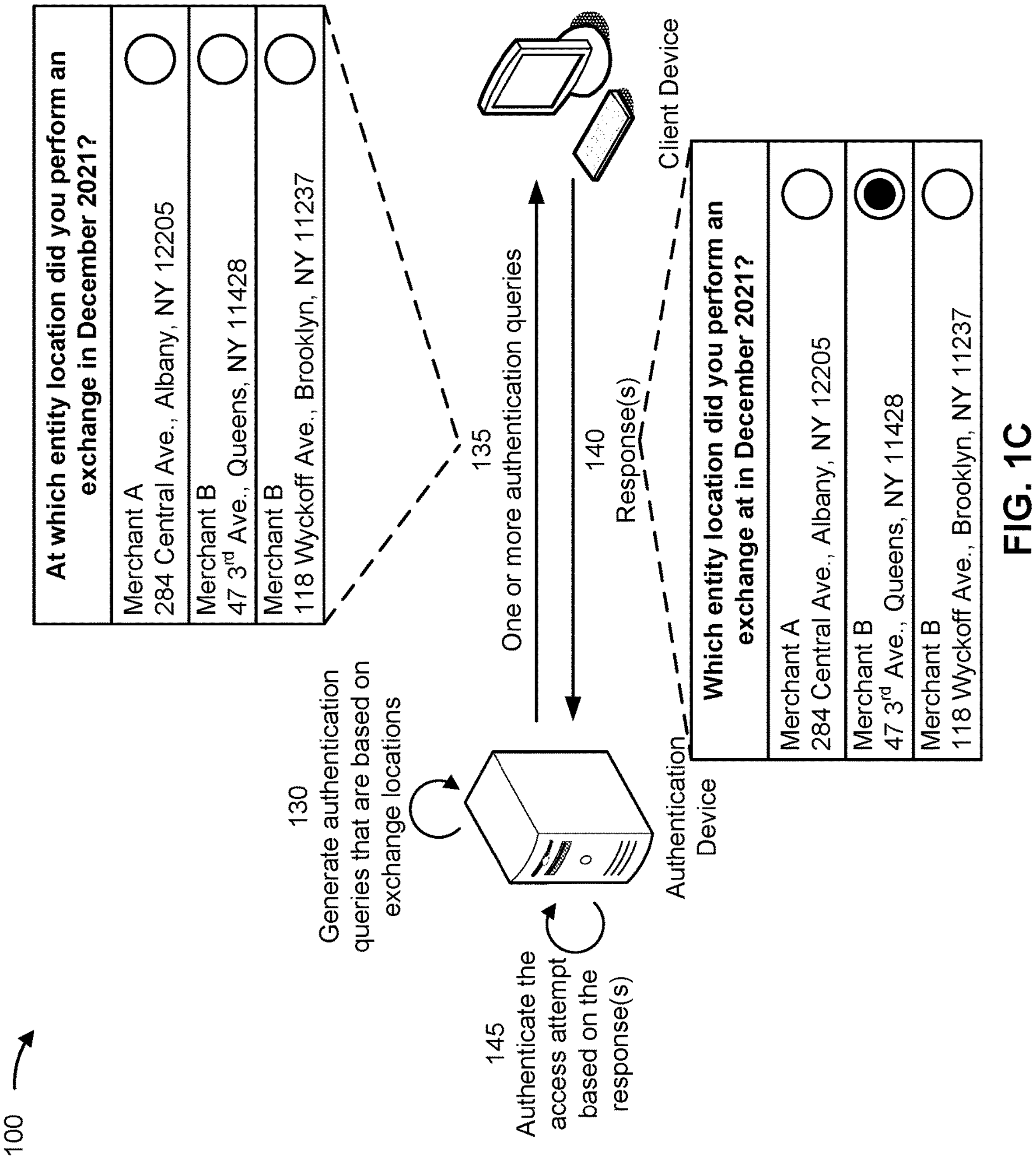

FIGS. 1A-1C are diagrams of an example 100 associated with multi-factor authentication using location data. As shown in FIGS. 1A-1C, example 100 includes an authentication device, an entity database, and a client device. These devices are described in more detail in connection with FIGS. 3 and 4.

The authentication device may perform one or more operations associated with an account. For example, the authentication device may be associated with an entity that provides, manages, or otherwise is associated with the account. In some implementations, the account may be a financial account that is associated with exchange records. As used herein, "exchange" may refer to a transaction, an electronic exchange, a sale, a purchase, and/or a transfer, among other examples. For example, "exchange" and "transaction" may be used interchangeably herein. As used herein, "exchange medium" may refer to a transaction device, a physical exchange medium, a payment device, a transaction card, a credit card, a debit card, a payment application executing on a user device, and/or a digital wallet associated with a user device, among other examples.

For example, the authentication device may use physical locations (e.g., addresses or other identifying information) of transactions associated with the account to authenticate access attempts to the account. "Access attempt" may refer to an attempt to access information associated with the account and/or to perform operations or functions associated with the account. For example, an access attempt may include a user attempting to log in to the account (e.g., via an application or a web page). As another example, an access attempt may include a user attempting to perform a transfer of resources or funds associated with the account.

As shown in FIG. 1A, and by reference number 105, the authentication device may obtain records (e.g., exchange records) associated with one or more exchanges that are associated with an account. For example, the records may be records that are stored for the purpose of tracking transactions that are associated with the account. For example, the records may include information that is provided by a backend device (e.g., a transaction backend) as part of completing an exchange. As shown in FIG. 1A, a record for a given exchange may be associated with metadata that is associated with the given exchange. For example, the metadata may include transaction data, such as time stamp information (e.g., a date or time of an exchange), account identification data, an amount of an exchange, entity identification data (e.g., merchant identification information, such as a merchant identifier (ID)), and/or location data associated with the exchange (e.g., city information, state information, and/or zip code information), among other examples. For example, a first exchange (e.g., "Exchange 1") may be associated with metadata identifying that the first exchange is associated with a merchant identifier of "123," a date of "12/20/2021," a city and state of "Queens, New York," and/or a zip code of "11428," among other examples.

In some examples, the authentication device may obtain the location data associated with the exchanges from a database storing exchange records. In other examples, the authentication device may obtain the location data associated with the exchanges from location data associated with a device, such as a user device or mobile phone. For example, the location data of a given exchange may be based on positioning data of the device at, or near, a time when the given exchange occurred.

As shown in FIG. 1A, the location data indicated by the records that are stored associated with the account may indicate a general or high level indication of the location associated with a given exchange. For example, the location data indicated by the records may be at a low level of granularity. As an example, the most detailed or specific data associated with a location of a given exchange may be a zip code (e.g., a postal code or a postcode). In other words, the location data indicated by the records may indicate a large geographic area (e.g., associated with a zip code or postal code) in which there may be multiple entity locations that could be associated with the exchange. For example, within a geographic area associated with a given zip code, there may be multiple entity locations (e.g., physical locations) that are associated with a given merchant. Therefore, the authentication device may be unable to use the location data indicated by the records to generate authentication queries that have enough specificity to ensure that the user providing responses to the authentication queries was actually present when a given exchange occurred.

Therefore, as shown by reference number 110, the authentication device may determine geographic location information associated with one or more exchanges (e.g., that are indicated by the records obtained by the authentication device). For example, the authentication device may analyze the records to identify or determine second location data associated with the one or more exchanges. The second location data may identify respective physical locations associated with the one or more exchanges. The second location data may include address information associated with respective entity locations (e.g., physical locations) at which the one or more exchanges occurred. In other words, the second location data may be associated with a level of granularity that is higher than the level of granularity associated with the location data indicated by the records. In some implementations, the authentication device may determine physical locations and/or address information associated with an exchange indicated by the records based on the records indicating that the exchange is associated with an in-store exchange (e.g., rather than a purely online or card-not-present exchange).

The authentication device may determine the second location data (e.g., physical locations and/or address information) associated with the one or more exchanges using a machine learning model. Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples. The training and use of a machine learning model to determine the second location data is described in more detail in connection with FIG. 2.

In some implementations, the authentication device may determine the second location data using an entity location database. For example, the entity location database may store specific location data (e.g., physical locations and/or address information) associated with various entity locations. In some implementations, the entity location database may be associated with a given entity or merchant (e.g., the entity location database may identify specific location data associated with various entity locations of the given entity or merchant). Additionally, or alternatively, the entity location database may be associated with multiple entities or merchants (e.g., the entity location database may identify specific location data associated with various entity locations of the multiple entities or merchants). For example, the entity location database may be associated with a third-party that has obtained the specific location data (e.g., via surveys, web scraping, and/or information received from various entities or merchants, among other examples). In some implementations, the entity location database may be stored by the authentication device (e.g., in memory associated with the authentication device or in a cloud-based storage location). In some implementations, the authentication device may access the entity location database from a storage location (e.g., from memory associated with the authentication device or from a cloud-based storage location).

The authentication device may compare information indicated by the records to entries included in the entity location database to determine a likelihood that a given entry (e.g., identifying a given physical location) is associated with a given exchange indicated by the records. For example, the authentication device may query or search the entity location database (e.g., that includes indications of a set of physical locations associated with one or more entities). The authentication device may query or search the entity location database using information indicated by the records that are associated with the account. For example, the authentication device may query or search the entity location database using metadata associated with the one or more exchanges. The authentication device may query or search the entity location database using a merchant identifier, a merchant name, a city, a state, a zip code, and/or other relevant information indicated by the records associated with a given exchange.

The authentication device may identify an entry in the entity location database that is associated with an exchange of the one or more exchanges based on the entry including information that is associated with the first location data (e.g., a same or similar merchant identifier, city, state, and/or zip code, among other examples). Querying or searching the entity location database in this manner may enable the authentication device to identify entries included in the entity location database that may be associated with a given location. This may reduce a processing or computing overhead associated with determining the specific location data (e.g., a physical location and/or address information) associated with a given exchange. For example, rather than analyzing all entries of the entity location database using the machine learning model, the authentication device may pre-process the entries of the entity location database to identify entries that have a likelihood of being associated with a given exchange (e.g., as described above). For example, the entity location database may include hundreds, thousands, or millions of entries. Therefore, analyzing all entries included in the entity location database using the machine learning model may utilize significant computing and/or processing overhead. By querying or searching the entity location database in the manner described herein, the computing and/or processing overhead may be reduced by enabling the authentication device to identify relevant entries prior to analyzing the entries using the machine learning model.

For example, as shown in FIG. 1A, the authentication device may determine that an entry included in the entity location data (e.g., associated with index "002") may be associated with an exchange (e.g., the "Exchange 1") indicated by the records. For example, the authentication device may determine that the entry and the exchange are both associated with the same merchant identifier and/or zip code. The authentication device may provide information included in the entry of the database and exchange information (e.g., metadata) associated with the exchange as inputs to the machine learning model. As described elsewhere herein, the entry may be associated with and/or identify a physical location (e.g., an address of "47 3$^{rd}$ Avenue").

The authentication device may obtain a score output by the machine learning model based on providing the information included in the entry of the database and exchange information (e.g., metadata) associated with the exchange as inputs to the machine learning model. For example, the machine learning model may be trained to compare information included in an entry in the database to metadata associated with an exchange to determine a likelihood that the entry is associated with a physical location at which the exchange occurred. For example, the score output by the machine learning model may indicate a likelihood that the entry is associated with a physical location at which the exchange occurred (e.g., on a scale of 0 to 100, where 100 indicates a high likelihood and 0 indicates a low likelihood).

The authentication device may determine that the exchange is associated with the physical location (e.g., indicated by the entry in the entity location database) based on the score satisfying a threshold. For example, the authentication device may determine the second location data associated with the exchange (e.g., the address information of "47 3$^{rd}$ Avenue") based on the information included in the entry of the entity location database. The authentication device may determine physical locations and/or address information associated with other exchanges indicated by the records in a similar manner.

In this way, the authentication device may cleanse the metadata (e.g., may perform data cleansing of the data indicated by the records) associated with various exchanges by determining additional location information (e.g., physical locations and/or address information) associated with one or more exchanges. This may enable the authentication device to determine authentication queries using specific location data (e.g., physical locations and/or address information) at which an exchange occurred, as described in more detail elsewhere herein.

As shown in FIG. 1B, the authentication device may detect an access attempt associated with the account. For example, as shown by reference number 115, the authentication device may receive a request to access the account and/or to perform an operation or function associated with the account. For example, the authentication device may obtain credentials associated with the account (e.g., from the client device). The credentials may include a username and a password, and/or biometric information (e.g., a face scan, a fingerprint, and/or voice scan), among other examples. The credentials may be a first layer of security associated with a multi-factor authentication technique used to secure the account (e.g., with a second layer being authentication queries that are based on the specific location data at which transactions associated with the account occurred, as explained in more detail elsewhere herein).

As shown by reference number 120, the authentication device may authenticate the credentials associated with the account. For example, the authentication device may compare the credentials provided to the authentication device with credentials stored by the authentication device. The authentication device may determine whether the credentials provided to the authentication device are authentic and/or correct based on the credentials matching the credentials associated with the account that are stored by the authentication device. For example, the authentication device may obtain a username and a password associated with the account. The authentication device may search for a password associated with the username in a password database or other database associated with the authentication device. The authentication device may determine whether the password provided as part of the access attempt matches the password stored by the authentication device. If the provided password matches the password stored by the authentication device, then the authentication device may determine that the credentials are authenticated and/or are correct. If the provided password does not match the password stored by the authentication device, then the authentication device may determine that the credentials are not authenticated and/or are incorrect (e.g., the authentication device may deny access to the account).

As shown by reference number 125, the authentication device may detect an authentication event associated with the access attempt. For example, the authentication device may be associated with securing the account after authenticating credentials associated with the account are received. In some implementations, the authentication device may detect the authentication event based on a purpose associated with the access attempt. For example, certain purposes associated with an access event may trigger an authentication event. For example, purposes that may be associated with a potential of fraud may trigger an authentication event. Example purposes that may trigger an authentication event may include changing a password or other credential associated with the account, accessing resources or funds associated with the account, transferring resources or funds associated with the account, and/or changing contact information associated with the account, among other examples. For example, the purpose may be associated with a higher likelihood of fraud and/or with accessing resources or funds associated with the account. Therefore, the authentication device may perform additional operations to secure the account, as described herein.

Additionally, or alternatively, the authentication device may detect the authentication event based on device information associated with the access attempt. For example, the device information may be associated with the client device. For example, the authentication device may detect the authentication event based on determining that the client device has not previously been used to access the account (e.g., based on the client device being a "new" device that is used to access the account). For example, the authentication device may store identifiers or Internet Protocol (IP) addresses associated with devices used to access the account. If the identifier or IP address is not included in the stored identifiers or IP addresses, then the authentication device may detect an authentication event. For example, a new device accessing the account may be associated with a higher likelihood of fraud. Therefore, the authentication device may perform additional operations to secure the account, as described herein.

In some implementations, the authentication device may detect the authentication event based on a likelihood of fraud associated with the access attempt. For example, the authentication device may be associated with one or more fraud models (e.g., machine learning models) that are trained to detect a likelihood of fraud associated with an access attempt. The authentication device may input a purpose of the access attempt, device information associated with the access attempt, a time associated with the access attempt, and/or other metadata associated with the access attempt into a fraud model. The fraud model may output a fraud score associated with the access attempt. If the fraud score satisfies a threshold, then the authentication device may determine that an authentication event is detected.

As shown in FIG. 1C, and by reference number 130, the authentication device may generate one or more authentication queries that are based on exchange locations associated with the account (e.g., physical locations or addresses at which exchanges associated with the account occurred). For example the physical locations or addresses at which exchanges associated with the account occurred may be determined by the authentication device as described in more detail elsewhere herein, such as in connection with FIG. 1A. As an example, an authentication query, of the one or more authentication queries, may be associated with requesting confirmation of a location at which an exchange, of the one or more exchanges, occurred. For example, the authentication query may identify exchange data associated with the exchange indicated by the records, and/or an indication of one or more physical locations, where a physical location, of the one or more physical locations, is the location at which the exchange occurred as indicated by the respective physical locations associated with the one or more exchanges.

For example, the authentication query may be a multiple choice question. The authentication query may indicate exchange data associated with the exchange in a prompt of the authentication query. The prompt may be "At which location did you perform an exchange in December 2021," where December 2021 is the exchange data (e.g., a date associated with the exchange). In some implementations, the authentication query may be a multiple choice question where choices provided indicate various exchange locations with one or more of the choices being physical locations at which an exchange associated with the account was completed.

For example, as shown in FIG. 1C, an authentication query may include one correct answer (e.g., "Merchant B, 47 3$^{rd}$ Ave., Queens, NY 11428," which is associated with the Exchange 1 depicted in FIG. 1A) and two incorrect answers. The authentication device may determine the incorrect answers based on actual entity locations (e.g., indicated by the entity location database) to increase a difficulty associated with answering the authentication query correctly (e.g., thereby improving a security associated with the account). In some implementations, an authentication query may be associated with multiple correct answers. In some implementations, for an authentication query to be considered answered correctly, the authentication device may require that at least one of the correct answers is indicated in a response to the authentication query. Alternatively, the authentication device may require that all of the correct answers are indicated in a response to the authentication query. As another example, an authentication query may be a yes-or-no question that requests the user to confirm whether an exchange associated with the account was completed at a given physical location or address (e.g., "did you complete an exchange at Merchant B, 47 3$^{rd}$ Ave., Queens, NY 11428 in December 2021?").

In some implementations, an authentication query, of the one or more authentication queries may be associated with requesting confirmation of payment technique associated with an exchange of the one or more exchanges. For example, the payment technique may be indicated by the records associated with the account. The payment technique may include or indicate a manner in which an exchange was initiated. For example, payment techniques may include swiping a card (e.g., initiating an exchange via a magnetic stripe included on a card), using a contactless payment method (e.g., "tapping" a card to initiate an exchange via near-field communication (NFC) or another wireless communication technology), using a chip included in a card (e.g., a EUROPAY, MASTERCARD, and VISA (EMV) chip), and/or a card-not-present technique (e.g., inputting a card number), among other examples. An authentication query may request that a user confirm the payment technique used to complete a given transaction (e.g., "Did you swipe your card to complete this transaction?" or "Did you tap your card to complete this transaction?"). In some implementations, a first authentication query, of the one or more authentication queries, may request a confirmation of an address associated with an exchange and a second authentication query, of the one or more authentication queries, may request a confirmation of a method of payment or payment technique, indicated by the records, associated with the exchange.

In some implementations, a quantity of the one or more authentication queries may be based on the access attempt. For example, the quantity of the one or more authentication queries may be based on the purpose associated with the access attempt (e.g., a purpose that is associated with a higher risk or likelihood of fraud may cause the authentication device to provide more authentication queries). As another example, the quantity of the one or more authentication queries may be based on a fraud score associated with the access attempt (e.g., the authentication device may provide more authentication queries for an access attempt associated with a higher fraud score and less authentication queries for an access attempt associated with a lower fraud score).

As shown by reference number 135, the authentication device may transmit, and the client device may receive, an indication of the one or more authentication queries. The authentication device may provide, based on detecting the authentication event, the one or more authentication queries that are based on the second location data (e.g., the specific entity locations), where the one or more authentication queries are associated with at least one of the respective physical locations associated with the one or more exchanges. For example, the authentication device may transmit instructions that cause the one or more authentication queries to be displayed by the client device. The client device may obtain user input indicating response(s) to the one or more authentication queries. For example, a user may interact with the client device to provide responses to the one or more authentication queries. As shown by reference number 140, the client device may transmit, and the authentication device may receive, the response(s) to the one or more authentication queries.

As shown by reference number 145, the authentication device may authenticate the access attempt associated with the account based on the one or more responses to the one or more authentication queries. For example, the authentication device may authenticate the access attempt associated with the account based on a multi-factor authentication technique that includes determining whether one or more responses to the one or more authentication queries are correct and determining whether the credentials (e.g., username and password or biometric information) provided as part of the access attempt are correct.

The authentication device may grant or deny access to the account based on the one or more responses to the one or more authentication queries. For example, the authentication device may determine whether the one or more responses to the one or more authentication queries are correct. The authentication device may grant access to the account if the one or more responses are correct. Alternatively, the authentication device may deny access to the account if the one or more responses are incorrect.

In some implementations, the authentication device may provide additional authentication queries to the client device if one or more of the responses to the initial authentication queries is incorrect. For example, the authentication device may obtain a first response, of the one or more responses, associated with a first authentication query of the one or more authentication queries. The first response may be incorrect. The authentication device may provide a second one or more authentication queries of the one or more authentication queries based on the first response being incorrect. The authentication device may authenticate the access attempt based on a second one or more responses to the second one or more authentication queries being correct.

In some implementations, the authentication device may perform an action associated with a fraud detection model that is associated with the account based on the first response being incorrect. For example, the authentication device may cause a score or parameter indicating a likelihood of fraud associated with the account to be increased. In other words, the authentication device may grant access to the account based on the second one or more responses to the second one or more authentication queries being correct and may also cause a score or parameter indicating a likelihood of fraud associated with the account to be increased based on the first response being incorrect. This may improve a security parameter associated with the account by enabling other devices or processes associated with the account to identify the increased risk of fraud associated with the account. For example, other devices or other functions associated with the account may use the fraud detection model to make determinations or perform actions associated with the account. By providing an input to the fraud detection model indicating a higher likelihood of fraud due to the incorrect response to the authentication query, overall account security may be improved. For example, a model or device that determines whether an exchange associated with the account is fraudulent may be enabled to use the input to the fraud detection model indicating a higher likelihood of fraud due to the incorrect response to the authentication query, improving a fraud detection parameter associated with exchanges associated with the account.

As indicated above, FIGS. 1A-1C are provided as an example. Other examples may differ from what is described with regard to FIGS. 1A-1C.

Figure 2:
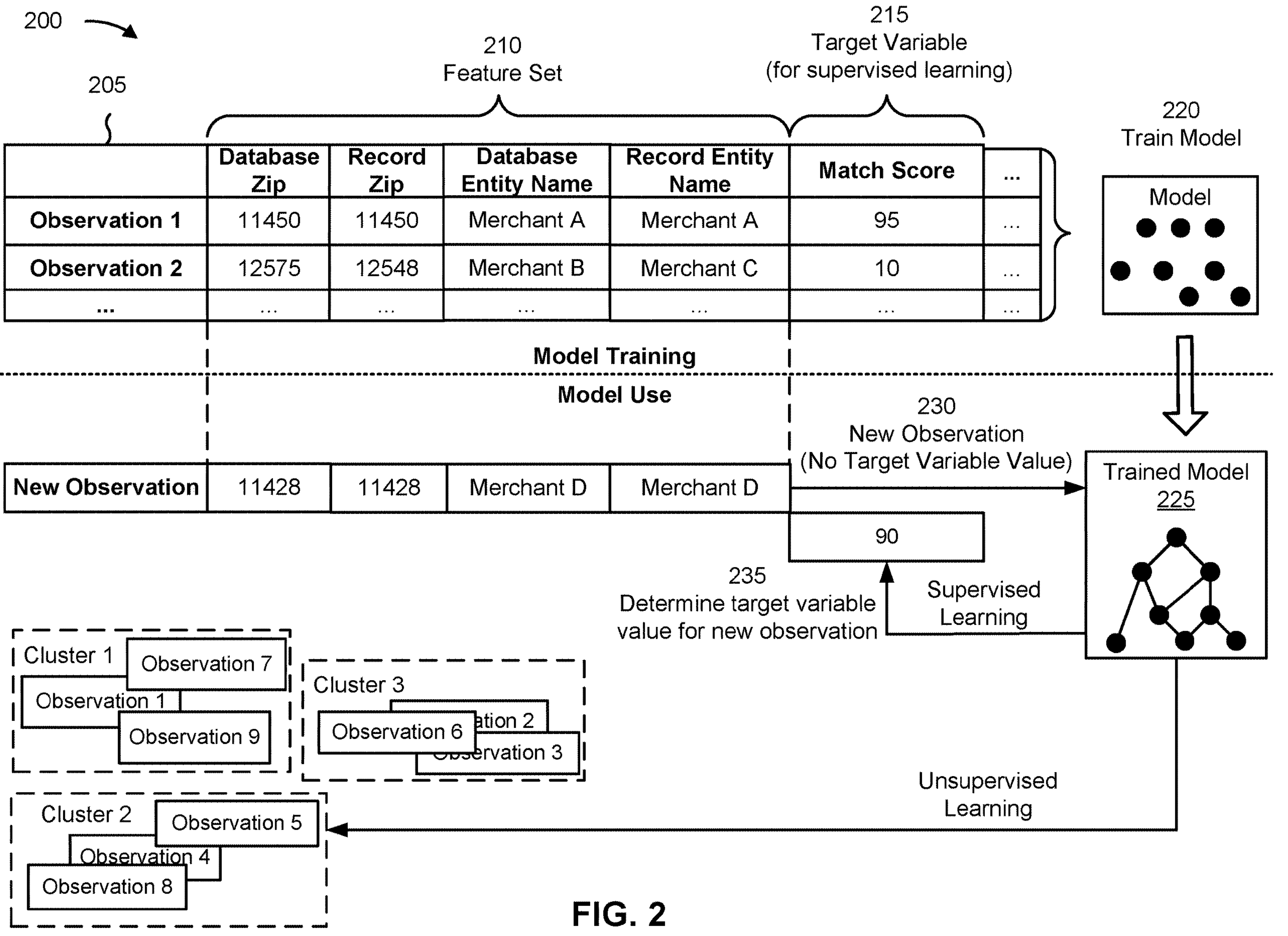
FIG. 2 is a diagram illustrating an example of training and using a machine learning model in connection with multi-factor authentication using location data, in accordance with some embodiments of the present disclosure.

FIG. 2 is a diagram illustrating an example 200 of training and using a machine learning model in connection with multi-factor authentication using location data. The machine learning model training and usage described herein may be performed using a machine learning system. The machine learning system may include or may be included in a computing device, a server, a cloud computing environment, or the like, such as an exemplary authentication device, as described in more detail elsewhere herein such as authentication device 310 of FIG. 3.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the authentication device 310, an entity location database 320, or a transaction backend, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the authentication device 310, the entity location database 320, or a transaction backend. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a set of information as indicated by a database (e.g., the entity location database 320) and a set of information indicated by exchange records. For example, one or more features may be associated with information indicated by the database and information indicated by the exchange record. For example, a feature set for a set of observations may include a first feature of a database zip code (e.g., indicated by an entry in the entity location database 320), a second feature of a record zip code (e.g., indicated by an exchange record), a third feature of a database entity name (e.g., indicated by the entry in the entity location database 320), a fourth feature of a record entity name (e.g., indicated by the exchange record), and so on. As shown, for a first observation, the first feature may have a value of 11450, the second feature may have a value of 11450, the third feature may have a value of “Merchant A,” the fourth feature may have a value of “Merchant A,” and so on. These features and feature values are provided as examples, and may differ in other examples. For example, the feature set may include one or more of the following features: city information, state information, merchant identifier information, and/or entity location identifiers (e.g., a store number or other identifier of respective physical locations), among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is match score, which has a value of 95 for the first observation. For example, the match score may indicate a likelihood that an entry included in the database (e.g., the entity location database 320) is associated with a given exchange.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical exchange data and information stored by the entity location database 320. For example, the machine learning system may obtain training data using exchange information from previous exchanges (e.g., associated with an account or multiple accounts). For example, the exchange information may be information indicated in records associated with the exchanges.

As shown by reference number 230, the machine learning system may apply the trained machine learning model 225 to a new observation, such as by receiving a new observation and inputting the new observation to the trained machine learning model 225. As shown, the new observation may include a first feature of a database zip code (e.g., indicated by an entry in the entity location database 320), a second feature of a record zip code (e.g., indicated by an exchange record), a third feature of a database entity name (e.g., indicated by the entry in the entity location database 320), a fourth feature of a record entity name (e.g., indicated by the exchange record), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 90 for the target variable of match score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, that the entry in the entity location database 320 is associated with an exchange. The first automated action may include, for example, performing an association or a linkage between a record associated with the exchange and information indicated by the entry (e.g., associated with exchange with specific location information indicated by the entry, such as address information).

As another example, if the machine learning system were to predict a value of 15 for the target variable of match score, then the machine learning system may provide a second (e.g., different) recommendation (e.g., that the entry in the entity location database 320 is not associated with an exchange) and/or may perform or cause performance of a second (e.g., different) automated action (e.g., store an indication that the exchange is not associated with the particular entry).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication of whether a predicted match between an entry in the entity location database 320 and an exchange is correct.

In this way, the machine learning system may apply a rigorous and automated process to determine specific or granular location data associated with exchanges (e.g., by matching the exchange to an entry in a database) using location data and/or other information provided as part of completing the exchange. The machine learning system enables recognition and/or identification of tens, hundreds, thousands, or millions of features and/or feature values for tens, hundreds, thousands, or millions of observations, thereby increasing accuracy and consistency and reducing delay associated with determining the specific or granular location data associated with exchanges relative to requiring computing resources to be allocated for tens, hundreds, or thousands of operators to manually determine the specific or granular location data associated with exchanges using the features or feature values.

As indicated above, FIG. 2 is provided as an example. Other examples may differ from what is described in connection with FIG. 2.

Figure 3:
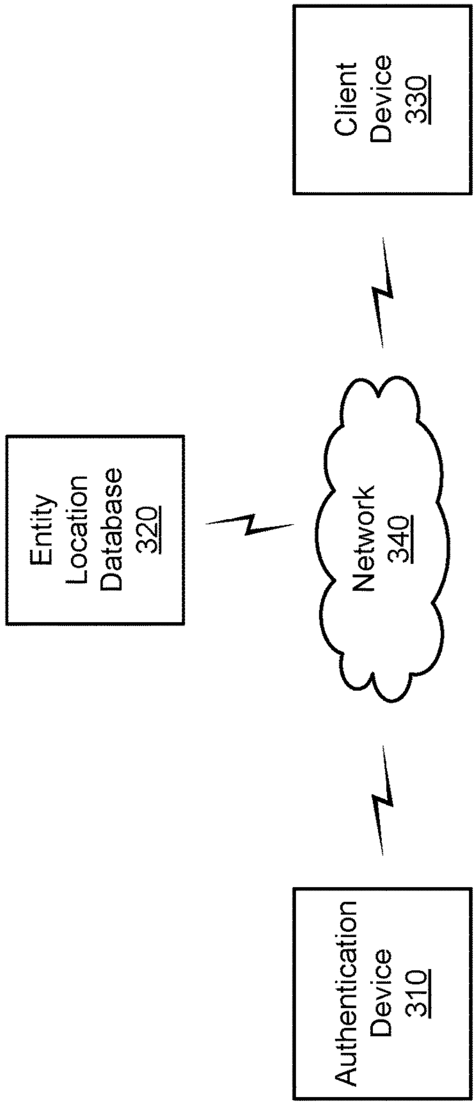
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an authentication device 310, an entity location database 320, a client device 330, and a network 340. Devices of environment 300 may interconnect via wired connections, wireless connections, or a combination of wired and wireless connections.

The authentication device 310 includes one or more devices capable of receiving, generating, storing, processing, providing, and/or routing information associated with multi-factor authentication using location data, as described elsewhere herein. The authentication device 310 may include a communication device and/or a computing device. For example, the authentication device 310 may include a server, such as an application server, a client server, a web server, a database server, a host server, a proxy server, a virtual server (e.g., executing on computing hardware), or a server in a cloud computing system. In some implementations, the authentication device 310 includes computing hardware used in a cloud computing environment.

The entity location database 320 may include one or more devices capable of receiving, generating, storing, processing, and/or providing information associated with multi-factor authentication using location data, as described elsewhere herein. The entity location database 320 may include a communication device and/or a computing device. For example, the entity location database 320 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the entity location database 320 may store information associated with addresses of various entity locations (e.g., store locations), as described elsewhere herein.

The client device 330 may include one or more devices capable of receiving, generating, storing, processing, and/or providing information associated with multi-factor authentication using location data, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
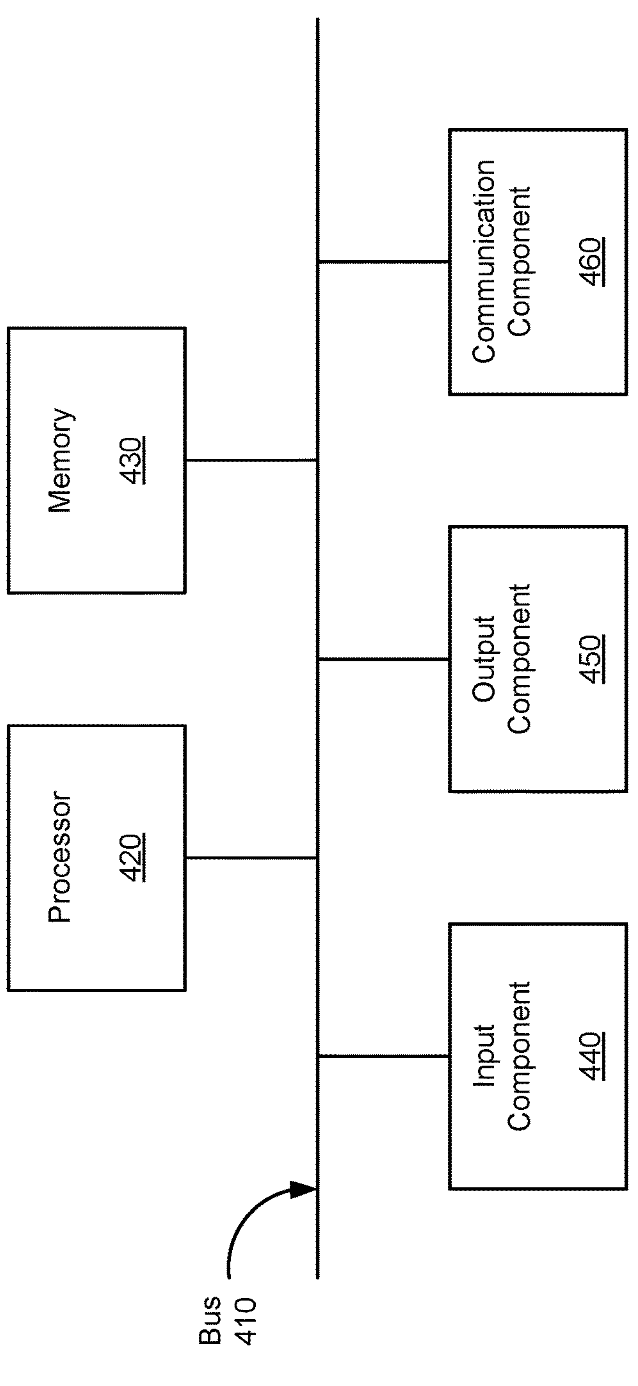
FIG. 4 is a diagram of example components of a device associated with multi-factor authentication using location data, in accordance with some embodiments of the present disclosure.

FIG. 4 is a diagram of example components of a device 400 associated with multi-factor authentication using location data. Device 400 may correspond to the authentication device 310, the entity location database 320, and/or the client device 330. In some implementations, the authentication device 310, the entity location database 320, and/or the client device 330 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
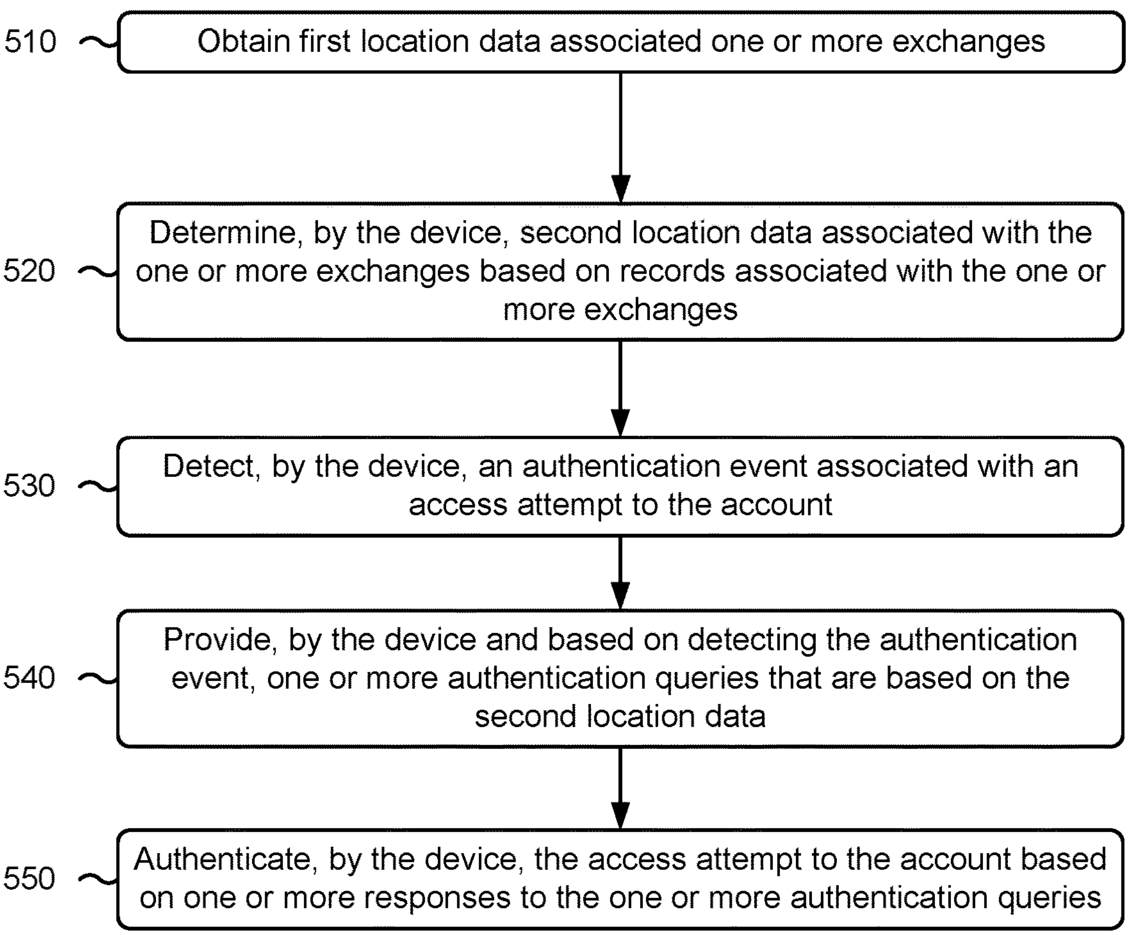
FIG. 5 is a flowchart of an example process associated with multi-factor authentication using location data, in accordance with some embodiments of the present disclosure.

FIG. 5 is a flowchart of an example process 500 associated with multi-factor authentication using location data. In some implementations, one or more process blocks of FIG. 5 may be performed by the authentication device 310. In some implementations, one or more process blocks of FIG. 5 may be performed by another device or a group of devices separate from or including the authentication device 310, such as the entity location database 320 and/or the client device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining first location data associated with one or more exchanges (block 510). In some implementations, the first location data may be associated with records of an account that are associated with one or more exchanges. As noted above, an "exchange" may refer to a transaction, an electronic exchange, a sale, a purchase, and/or a transfer, among other examples. In some implementations, the first location data is associated with a first level of granularity. For example, the authentication device 310 (e.g., using processor 420 and/or memory 430) may obtain first location data, as described above in connection with reference number 105 of FIG. 1A. As an example, the authentication device 310 may obtain exchange data associated with a given account that indicates location data such as a city, state, and/or zip code (e.g., postal code), among other examples.

As further shown in FIG. 5, process 500 may include determining second location data associated with the one or more exchanges based on the records (block 520). In some implementations, the second location data is associated with a second level of granularity that is higher than the first level of granularity. For example, the authentication device 310 (e.g., using processor 420 and/or memory 430) may determine second location data associated with the one or more exchanges based on the records, wherein the second location data is associated with a second level of granularity that is higher than the first level of granularity, as described above in connection with reference number 110 of FIG. 1A. As an example, the authentication device 310 may determine specific location data associated with a given exchange, such as a physical location and/or address information associated with the given exchange. In some implementations, the authentication device 310 may determine second location data associated with the one or more exchanges based on information indicated in an entry of the entity location database 320.

As further shown in FIG. 5, process 500 may include detecting an authentication event associated with an access attempt to the account (block 530). For example, the authentication device 310 (e.g., using processor 420 and/or memory 430) may detect an authentication event associated with an access attempt to the account, as described above in connection with reference number 125 of FIG. 1B. As an example, the authentication event may be associated with an access attempt that requires a heightened level of security for accessing the account. For example, the authentication event may be associated with a purpose associated with the access attempt (e.g., changing a password, transferring funds from the account, among other examples) and/or device information (e.g., associated with the client device 330) associated with the access attempt.

As further shown in FIG. 5, process 500 may include providing, based on detecting the authentication event, one or more authentication queries that are based on the second location data (block 540). For example, the authentication device 310 (e.g., using processor 420 and/or memory 430) may provide, based on detecting the authentication event, one or more authentication queries that are based on the second location data, as described above in connection with reference number 135 of FIG. 1C. As an example, the one or more authentication queries may request confirmation of specific location data (e.g., a physical location or address, as indicated by the second location data) at which an exchange occurred.

As further shown in FIG. 5, process 500 may include authenticating the access attempt to the account based on one or more responses to the one or more authentication queries (block 550). For example, the authentication device 310 (e.g., using processor 420 and/or memory 430) may authenticate the access attempt to the account based on one or more responses to the one or more authentication queries, as described above in connection with reference number 145 of FIG. 1C. As an example, the authentication device 310 may grant access to the account if the one or more responses to the one or more authentication queries are correct (e.g., correctly confirm or identify a physical location or an address at which an exchange associated with the account occurred). Alternatively, the authentication device 310 may deny access to the account if the one or more responses to the one or more authentication queries are incorrect.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for multi-factor authentication using location data, the system comprising:

one or more memories; and one or more processors, coupled to the one or more memories, configured to:

obtain first location data, of a first level of granularity, associated with one or more exchanges based on obtaining records that are associated with one or more transactions related to an account;

obtain information from an entity location database that includes second location data associated with the one or more exchanges, wherein the second location data is associated with a second level of granularity that is higher than the first level of granularity and includes information of a physical location associated with one or more entities and identifies respective physical locations associated with the one or more exchanges, wherein the entity location database includes information obtained via web scraping for the second location data;

pre-process entries of the entity location database based on searching using at least a merchant identifier, city, state, and zip code indicated by the records, to identify candidate entries likely associated with the one or more exchanges, thereby reducing computing overhead;

train, using the pre-processed entries of the entity location database, a machine learning model to determine a likelihood score that the one or more exchanges correspond to the respective physical locations;

provide information included in an entry of the entity location database and exchange information associated with an exchange, of the one or more exchanges, as inputs to the trained machine learning model, wherein the entry is associated with a physical location of the respective physical locations, that is associated with the one or more exchanges;

obtain, using the trained machine learning model, a score indicating a likelihood that the exchange corresponds to the physical location;

determine, based on the likelihood score satisfying a threshold, that the exchange is associated with the physical location;

receive, from a first device and over a network between the first device and the system, an access attempt associated with a request for access to the account that includes one or more credentials associated with a first layer of security to the account, wherein the first layer of security includes biometric information obtained via the first device;

authenticate the access attempt based on the one or more credentials based on the first layer of security;

detect an authentication event associated with granting access to the account, wherein the authentication event occurs after authenticating the access attempt is authenticated, for performing additional operations associated with a second layer of security related to the account;

provide, based on detecting the authentication event, one or more authentication queries that are based on the second location data, wherein the one or more authentication queries are associated with at least one of the respective physical locations associated with the one or more exchanges, and wherein the one or more authentication queries are provided to the first device in a prompt displayed on the first device;

grant or deny access to the account based on one or more responses to the one or more authentication queries;

re-train the machine learning model based on feedback information that is provided to the machine learning model via a feedback loop, wherein the feedback information is an output of the machine learning model including an indication of whether a predicted match between an entry in the entity location database and the exchange is correct; and utilize the re-trained machine learning model in subsequent likelihood score determinations.

2. The system of claim 1, wherein an authentication query, of the one or more authentication queries, is associated with requesting confirmation of a location at which an exchange, of the one or more exchanges, occurred, and wherein the authentication query identifies:

exchange data associated with the exchange, wherein the exchange data is indicated by the records, and an indication of one or more physical locations, where a physical location, of the one or more physical locations, is the location at which the exchange occurred as identified by the respective physical locations associated with the one or more exchanges.

3. The system of claim 1, wherein the first location data is associated with a first level of granularity and the second location data is associated with a second level of granularity, and wherein the second level of granularity is a higher level of granularity than the first location data.

4. The system of claim 1, wherein the first location data includes at least one of:

state information, city information, or zip code information.

5. The system of claim 4, wherein the second location data includes address information.

6. The system of claim 1, wherein an authentication query, of the one or more authentication queries, is associated with requesting confirmation of a payment technique associated with an exchange of the one or more exchanges, wherein the payment technique is indicated by the records.

7. The system of claim 1, wherein the machine learning model is re-trained based on the feedback information related to whether a predicted match between the one or more exchanges and the respective physical locations is correct.

8. A method of multi-factor authentication using location data, comprising:

obtaining, by a device, first location data associated with one or more exchanges based on obtaining records that are associated with one or more transactions related to an account, wherein the first location data is associated with a first level of granularity;

obtaining, by the device and from an entity location database, information that includes second location data associated with the one or more exchanges, wherein the second location data is associated with a second level of granularity that is higher than the first level of granularity and includes information of a physical location associated with one or more entities;

pre-process entries of the entity location database based on searching using at least a merchant identifier, city, state, and zip code indicated by the records, to identify candidate entries likely associated with the one or more exchanges, thereby reducing computing overhead;

training, by the device and using the pre-processed entries, a machine learning model to determine a score indicating a likelihood that an exchange of the one or more exchanges corresponds to a particular second location data;

obtaining, by the device and using the trained machine learning model, the score;

determining, by the device and based on the score satisfying a threshold, that the exchange is associated with the particular second location data;

receiving, by the device, from another device, and over a network between the device and the other device, an access attempt associated with a request for access to the account, that includes one or more credentials associated with a first layer of security to the account, wherein the first layer of security includes biometric information obtained via the other device;

authenticating, by the device, the access attempt based on the one or more credentials based on the first layer of security;

detecting, by the device, an authentication event associated with granting access to the account, wherein the authentication event occurs after authenticating the access attempt is authenticated, for performing additional operations associated with a second layer of security related to the account;

providing, by the device and based on detecting the authentication event, one or more authentication queries that are based on the particular second location data, wherein the one or more authentication queries are provided to the device in a prompt displayed on the device;

granting or denying access to the account based on one or more responses to the one or more authentication queries;

re-training the machine learning model based on feedback information that is provided to the machine learning model via a feedback loop, wherein the feedback information is an output of the machine learning model including an indication of whether a predicted match between an entry in the entity location database and the exchange is correct; and utilizing the re-trained machine learning model in subsequent score determinations.

9. The method of claim 8, wherein the second location data includes address information associated with respective entity locations at which the one or more exchanges occurred.

10. The method of claim 8, wherein detecting the authentication event comprises:

obtaining credentials associated with the account;

authenticating the credentials associated with the account; and detecting the authentication event based on at least one of a purpose associated with the access attempt or device information associated with the access attempt.

11. The method of claim 8, wherein authenticating the access attempt to the account comprises:

obtaining a first response, of the one or more responses, associated with a first authentication query of the one or more authentication queries, wherein the first response is incorrect;

providing a second one or more authentication queries of the one or more authentication queries based on the first response being incorrect;

authenticating the access attempt based on a second one or more responses to the second one or more authentication queries being correct; and performing an action associated with a fraud detection model that is associated with the account based on the first response being incorrect.

12. The method of claim 8, wherein the first location data is included in information provided by a backend device as part of completing an exchange, of the one or more exchanges, that is associated with an entity at which the exchange occurred.

13. The method of claim 8, wherein a first authentication query, of the one or more authentication queries, requests a confirmation of an address associated with an exchange, of the one or more exchanges, wherein the address is indicated by the second location data, and wherein a second authentication query, of the one or more authentication queries, requests a confirmation of a method of payment, indicated by the records, associated with the exchange.

14. The method of claim 8, wherein determining the second location data comprises:

searching, using the first location data, the entity location database;

identifying an entry in the entity location database that is associated with an exchange of the one or more exchanges based on the entry including information that is associated with the first location data; and determining the second location data based on information included in the entry of the entity location database.

15. The method of claim 8, wherein authenticating the access attempt to the account comprises:

determining whether the one or more responses to the one or more authentication queries are correct; and granting access to the account if the one or more responses are correct; or denying access to the account if the one or more responses are incorrect.

16. A non-transitory computer-readable medium storing a set of instructions, the set of instructions comprising:

one or more instructions that, when executed by one or more processors of a device, cause the device to:

obtain records associated with one or more exchanges that are associated with an account, wherein the records include first location data, of a first level of granularity, associated with the one or more exchanges;

obtain, from an entity location database, information that includes second location data associated with the one or more exchanges based on the records, wherein the second location data includes address information associated with respective entity locations at which the one or more exchanges occurred;

pre-process entries of the entity location database based on searching using at least a merchant identifier, city, state, and zip code indicated by the records, to identify candidate entries likely associated with the one or more exchanges, thereby reducing computing overheard;

train, using the pre-processed entries, a machine learning model to determine a score indicating a likelihood that an exchange of the one or more exchanges is related to a particular second location data;

obtain, using the trained machine learning model, the score;

determine that the exchange is associated with a particular entity location based on the score satisfying a threshold;

receive, from another device and over a network between the device and the other device, an access attempt associated with a request for access to the account, that includes one or more credentials associated with a first layer of security to the account, wherein the first layer of security includes biometric information obtained via the other device;

authenticate the access attempt based on the one or more credentials based on the first layer of security;

detect an authentication event associated with an access attempt to the account, wherein the authentication event occurs after authenticating the access attempt is authenticated, for performing additional operations associated with a second layer of security related to the account;

provide, based on detecting the authentication event, one or more authentication queries that are based on the particular entity location, wherein the one or more authentication queries are provided to the other device in a prompt displayed on the other device;

grant or deny access to the account based on one or more responses to the one or more authentication queries;

re-train the machine learning model based on feedback information that is provided to the machine learning model via a feedback loop, wherein the feedback information is an output of the machine learning model including an indication of whether a predicted match between an entry in the entity location database and the exchange is correct; and utilize the re-trained machine learning model in subsequent score determinations.

17. The non-transitory computer-readable medium of claim 16, wherein the one or more instructions, that cause the device to detect the authentication event, cause the device to:

obtain the credentials associated with the account;

authenticate the credentials associated with the account; and detect the authentication event based on at least one of a purpose associated with the access attempt or device information associated with the access attempt.

18. The non-transitory computer-readable medium of claim 16, wherein the one or more instructions, that cause the device to authenticate the access attempt to the account, cause the device to:

obtain a first response, of the one or more responses, associated with a first authentication query of the one or more authentication queries, wherein the first response is incorrect;

provide a second one or more authentication queries of the one or more authentication queries based on the first response being incorrect; and authenticate the access attempt based on a second one or more responses to the second one or more authentication queries being correct.

19. The non-transitory computer-readable medium of claim 18, wherein the one or more instructions further cause the device to:

perform an action associated with a fraud detection model that is associated with the account based on the first response being incorrect, wherein the action causes a score or parameter indicating a likelihood of fraud associated with the account to be increased.

20. The non-transitory computer-readable medium of claim 16, wherein the one or more instructions, that cause the device to determine the second location data, cause the device to:

search, using the first location data, the entity location database;

identify an entry in the entity location database that is associated with an exchange of the one or more exchanges; and determine an address associated with the exchange based on information included in the entry of the entity location database.

* * * * *